June 17, 1924.
C. BOUIN
STEREOSCOPE
Filed May 25, 1923
1,498,435
2 Sheets-Sheet 1
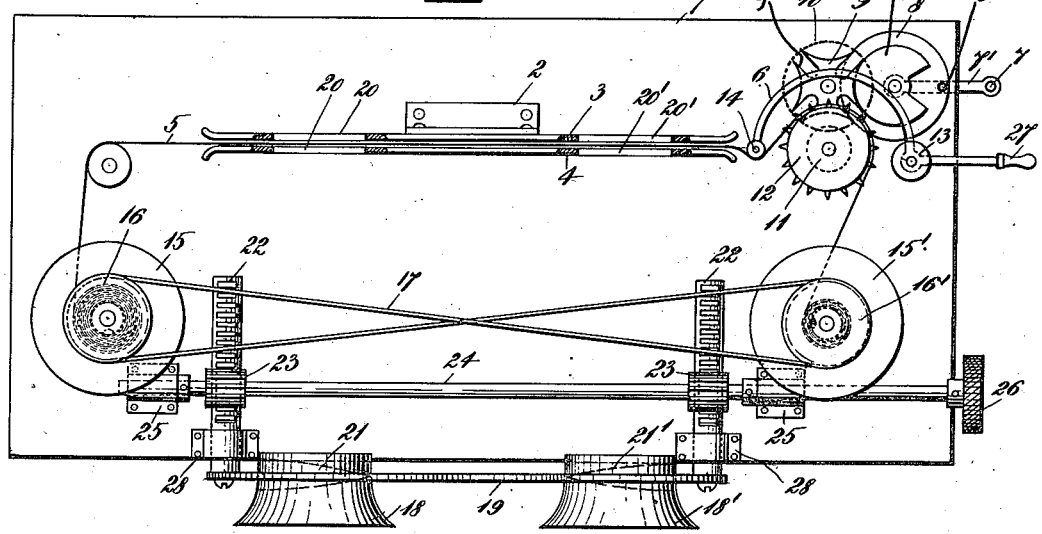

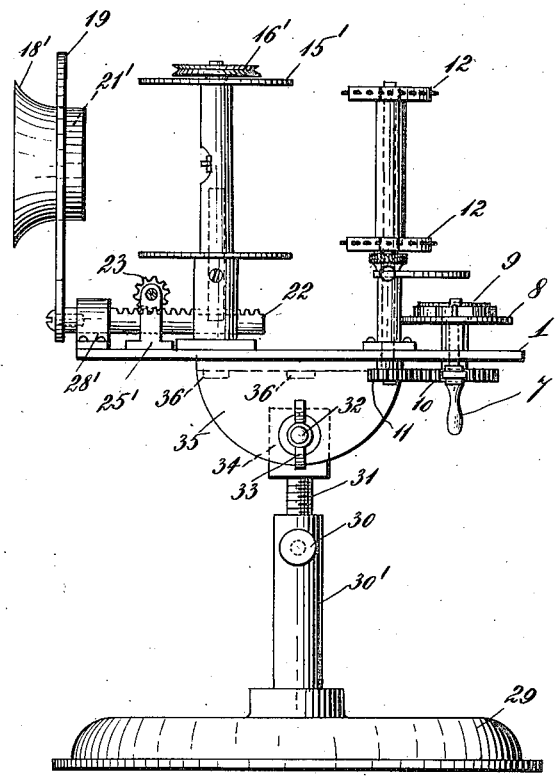

Patented June 17, 1924.

1,498,435

UNITED STATES PATENT OFFICE.

CHARLES BOUIN, OF BOSTON, MASSACHUSETTS.

STEREOSCOPE.

Application filed May 25, 1923. Serial No. 641,366.

*To all whom it may concern:*

Be it known that CHARLES BOUIN, a citizen of the United States, residing at Boston, in the county of Suffolk and State of Massachusetts, has invented certain new and useful Improvements in Stereoscopes, of which the following is a specification.

The present invention relates to improvements in stereoscopes in which viewing stereoscopic pairs of pictures in rapid sequence from a film strip may be effected conveniently and without having to hold the stereoscope in the hand.

It is an object of the invention to provide an apparatus in which a roll of film similar to the film used in motion picture apparatus may carry a great number of stereoscopic pairs of pictures depicting in sequence, if desired, the several phases of a drama; and to further provide in conjunction with the film strip an actuating mechanism for advancing the picture spaces upon the strip intermittently and for retaining for a predetermined period sufficient for adequate visual sensation the subsequent pairs of pictures before the opening in the film gate to be viewed through stereoscopic eye pieces.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view, with parts in section, showing an improved stereoscope constructed according to the present invention.

Figure 2 is a front elevation thereof, and

Figure 3 is a side elevation with the film removed for clearness.

Referring more particularly to the drawings, 1 designates a bed plate upon which is fixed a bracket 2 at an intermediate rear portion thereof to which are secured the members 3 and 4 constituting the film gate which extends for a considerable distance and is provided with the film openings 20 and 20' a distance apart corresponding substantially to the distance between the right and left eyes of the beholder.

The film gate is adapted to slidably receive the film strip 5 which may be of an opaque or translucent character and which is initially carried, for instance by a spool 15 detachably mounted at one forward corner of the bed plate to admit of its removal and substitution. After passing through the film gate, the film strip 5 is rewound upon a companion spool 15', pulleys 16 and 16' being fixed to the spools respectively and engaged by a crossed belt 17 to enable the spools to rotate in unison. The film strip 5 derives its intermittent movement from contact with sprockets 12 which engage the perforated margins of the film and in the instance shown the sprockets are mounted at one end of the film gate and in rear of the receiving sprocket 15'. It is to be understood that, although I have referred to the spool 15 as the original container for the film, the order may be reversed without affecting the principle of the invention.

Adjacent the sprockets 12 is a pressure roller 14 carried upon the free end of the curved arm 6 pivoted upon the bed plate 1 and having a handle 27 by which it may be adjusted angularly for the purpose of increasing or decreasing the pressure upon the film strip. The handle 27 projects outwardly beyond the side edge of the bed plate where it may be conveniently manipulated and, after adjustment, the parts are secured by a set nut 13.

The sprockets 12 are driven through a pinion 11 coupled to the shaft of the sprockets and extending beneath the bed plate 1. The pinion 11 is disposed in mesh with a gear wheel 10 mounted on the same shaft with a Geneva gear 9 which extends above the bed plate 1 and is in the form of a Maltese cross having slots 9' between the arms of the cross and extending substantially radially, while the outer ends of said arms are rounded or curved to conform to the periphery of a drum 8$^a$ which rotates in contact with such curved outer ends of the arms. The drum 8$^a$ moves with a drive disc 8 above which it is disposed, said drive disc being rotated by a handle 7 upon a crank or extension 7' secured to rotate said disc. The disc 8 is provided with a pin 8' adapted to take into the slots 9' in the Geneva gear 9 and the drum 8 is cut away or slotted opposite the pin as shown in Figure 1 in order to receive the arm of the Geneva gear following the pin. The engagement of the circumference of the drum with the curved outer end of the arms of the Geneva gear serves to avoid any accidental or casual movement of the film driving mechanism during the interval that the pictures remain stationary before the opening in the film gate. This is important in order that visual sensation may take place without any interference.

This visual sensation takes place through prismatic lenses 21 and 21' carried in eye pieces 18 and 18' which are mounted in the frame 19 movably carried by a pair of rack bars 22 which are slidable in the bearings 28 upon the forward edge of the base plate. Pinions 23 on a shaft 24 mesh with the rack bars 22 and by turning the head 26 on the outer end of the shaft 24 the adjustment of the eye pieces back and forth or toward and from the film gate may be effected. The shaft 24 is journaled in appropriate bearings 25 secured to said bed plate.

The bed plate itself is carried upon a semicircular bracket 35 having downwardly depending flanges receiving therebetween a head or block 34 carried upon the upper end of a threaded shaft 31 which engages within a tubular post 30' mounted upon a heavy base plate 29. By rotating the shaft 31 the bed plate and apparatus carried thereby may be elevated or lowered. A set screw 30 taking into the hollow post 30' provides for locking the parts in the adjusted position. The bracket 35 is secured to the under face of the bed plate 1 at substantially a central point by the use of the fastenings engaged at 36 and a bolt 32 serves to pivotally connect the bracket with the block 34. A winged nut 33 threaded upon the bolt 32 is used to lock the bracket against any inclining movement.

In the use of the device, a spool say 15, containing a film roll with stereoscopic pairs of pictures thereon, is mounted upon the bed plate 1, the initial end of the film being threaded through the film gate and about the drive sprocket 12, after which such end is engaged with the companion or rewind spool 15'. The eye pieces 18 and 18' are adjusted by manipulating the head 26 to secure the proper focal distance suitable to the beholder and the action is begun by rotating the end crank 7. Suitable pressure is of course put upon the film by the adjustment of the pressure roller 14. The turning of the handle 7 brings the pin 8' of the drive disc periodically in the successive slots 9' of the Geneva gear 9 and consequently intermittently rotates the gear wheel 10. An intermittent movement is thus transmitted to the pinion 11 and to the sprockets 12 which results in a drawing of the film through the film gate. The ratio of the gearing is such that at each successive movement, the film will be drawn a distance corresponding to the distance of two of the stereoscopic images so that a subsequent pair of images will each time be brought into accurate registry before the apertures in the gate. During the interim the film will be held against any casual movement and the film will be wound and unwound uniformly due to the drive connection between the spools. The sprockets will of course pull the film from the initial spool and the initial spool will drive the rewind spool through the belt 17.

It will be appreciated that through the vertical and inclining adjustment afforded by the pedestal upon which the base plate is mounted that the device is suitable for persons of all sizes; while the adjustment afforded the eye pieces accommodates the apparatus to great variations in vision. The apparatus will provide for viewing a large number of pictures contained upon the film strip in a short space of time and without abating the interest which the inconvenience and labor of replacing by hand single stereoscopic pictures always entails.

It is obvious that various changes and modifications may be made in the details of construction and design of the above specifically described embodiment of this invention without departing from the spirit thereof, such changes and modifications being restricted only by the scope of the following claims.

What is claimed is:—

1. A stereoscope or the like comprising a bed plate, a film gate thereon having a pair of apertures, a film having numerous pairs of stereoscopic pictures adapted to pass through said film gate, a Geneva movement for driving said film through said gate, and adjustable eye pieces for viewing said film.

2. A stereoscope or the like comprising a bed plate, a film gate thereon having spaced apertures, spools for holding and rewinding a film strip having stereoscopic pairs of pictures, drive means between said spools including a Geneva movement for urging said film through said gate, adjustable pressure means for engaging said film between the gate and the Geneva movement, eye pieces for viewing the film, and means for adjusting said eye pieces toward and from the film gate.

3. A stereoscope or the like comprising a base, a tubular threaded post thereon, a threaded shaft in said post, means to hold the shaft against movement, a block carried by said shaft, a bed plate, a bracket on the bed plate having depending flanges received upon and pivot to said block, means to hold the bed plate against pivotal movement on the block, a continuous film strip having stereoscopic pairs of pictures carried on said bed plate, means for intermittently advancing said film strip, and adjustable means for viewing the pictures.

4. A stereoscope or the like comprising a film gate having a pair of apertures, a film strip having stereoscopic pairs of pictures movable through said film gate, a sprocket for engaging said film, and a Geneva movement for turning said sprocket intermittently comprising a gear having a number of radial arms with slots between the arms, said arms having curved outer edges, a rotary driving disc having a pin adapted to enter said slots in sequence, and a drum carried by said disc for engaging the curved outer ends of said arms and having a slotted part opposite the pin to receive an arm of the gear.

5. A viewing apparatus comprising a film gate, spools at opposite sides of said film gate for containing and receiving a film strip having a series of pictures thereon, a Geneva gear for moving said film strip intermittently past said gate, pressure means for the film strip adjacent said gate and adjustable eye pieces arranged at opposite sides of said film gate.

6. A viewing apparatus comprising a bed plate, film spools thereon, a film gate for receiving the film from one spool, a Geneva motion for moving said film intermittently, drive means arranged between said spools, pressure means for the film at the side of said gate, and adjustable eye pieces at opposite sides of said gate.

7. A viewing apparatus comprising a film gate adapted to receive a film having a series of pictures thereon, a sprocket for moving said film through the gate, a Maltese cross gear connected to said sprocket and having slots between the arms of the cross and curved outer faces on said arms, a drive disc adjacent the gear having a pin adapted to enter the slots between said arms and having a drum adapted to engage with the curved outer ends of the arms, said drum having a gap therein adjacent the pin, means for rotating the disc, and eye pieces for viewing the film.

In testimony whereof I affix my signature.

CHARLES BOUIN.